Patented Feb. 7, 1933

1,896,793

UNITED STATES PATENT OFFICE

ALAN C. JOHNSTON, OF KENVIL, NEW JERSEY, ASSIGNOR TO HERCULES POWDER COMPANY, OF WILMINGTON, DELAWARE, A CORPORATION OF DELAWARE

METHOD OF SEPARATING TERPENE COMPOUNDS FROM GASOLINE USED FOR EXTRACTING ROSIN FROM WOOD

No Drawing. Application filed June 19, 1928. Serial No. 286,713.

My invention relates to a method for separating terpenes from gasoline, or other petroleum hydrocarbons, used for the extraction of rosin from wood.

As is well known, in the production of turpentine, pine oil and rosin by the steam and solvent process, wood chips are steamed to drive off the oil of turpentine and most of the pine oil giving turpentine and pine oil which are free from gasoline or other solvent. The chips are then treated with a solvent, as a low boiling gasoline, for extraction of the rosin along with such oils as remain in the chips. The gasoline is separated from the rosin by distillation and there is obtained as a by-product a mixture of terpenes, terpene alcohols, etc., from which gasoline of the quality generally employed, has not heretofore been separable by fractional distillation, due to the fact that the gasoline and the terpenes mixed therewith boil within the same range.

Heretofore the by-product mixture of gasoline and terpenes has commanded a low price, though the admixed terpene compounds, if separated, would have a higher value.

Now in accordance with my invention, I provide a method whereby the admixed gasoline and terpene compounds, may be profitably separated. In accordance with my invention I effect the separation by first treating a mixture, such as indicated and including dipentene, to effect a conversion of the terpenes into terpenes of higher boiling range. More particularly, I effect the conversion of the dipentene into its dihydrochloride and the subsequent conversion of the dipentene dihydrochloride formed into terpineol. The gasoline content of the mixture is not effected by the treatment and the major portion of the terpenes are ultimately changed into terpineol. Since terpineol boils at about 218° C. as compared with 175° C. at which the dipentene in the original mixture boils, a temperature which is too close to the boiling point of the gasoline to permit of effective separation by fractionation, the fractionation of the converted terpenes is made comparatively simple. After the conversion of the terpenes the fractionation is accomplished after first steam distilling the crude product from an alkaline medium.

In the treatment of the mixture of gasoline and terpene compounds to effect the conversion of the dipentene, I prefer to treat the mixture with hydrogen chloride, which need not be dry, hydrogen bromide, or the like, and for the alkaline medium, I prefer to use caustic soda, though I may use soda ash (sodium carbonate), lime, or the like.

As an example of the carrying out of my process, I add 10 parts of commercial hydrochloric acid to 500 parts of gasoline-terpene compound mixture and pass hydrogen chloride into the mixture at room temperature until the mixture becomes saturated. For example, the mixture will be saturated in about fifteen hours. After the mixture is saturated I permit it to stand for about ten hours and then steam distill it from, for example, about 250 parts of 10% aqueous sodium hydroxide, followed, if the oil passing over still contains small quantities of halogen compounds, by refluxing for about ten hours with 100 parts of sodium hydroxide in two liters of alcohol from which it is subsequently steam distilled with a yield of about 450 parts of oil, which may be readily fractionated. The product may be refined, for example, by heating under pressure, for example to about 150° C., with aqueous sodium hydroxide solution for several hours, or by heating with an alcoholic solution of sodium hydroxide to somewhat lower temperatures, for example, to about 125° C. The product may also be refined by heating with about 5% of either aniline or sodium acetate.

As an example of the effect of the treatment according to my invention, on the boiling range of the terpene compounds in the mixture, in a typical example, a mixture containing terpenes and gasoline boiling from about 155° C. to about 180° C. was converted into a product having a boiling range from below 165° C. to above 219° C. as shown in the following table:

| Per cent | Original °C. | Treated °C. |
|---|---|---|
| 5 | 155 | 165 |
| 10 | 158 | 177 |
| 20 | 159 | 179 |
| 50 | 162 | 184 |
| 70 | 166 | 191 |
| 90 | 175 | 204 |
| 95 | 180 | 219 |

The treated mixture may be readily fractionated and will give a fraction consisting largely of terpineol.

Having now fully described my invention, what I claim and desire to protect by Letters Patent is:

1. The method of separating terpene compounds from gasoline used in extracting rosin from wood, from which turpentine and pine oil have been removed which includes treating a mixture of solvent and terpene compounds with hydrogen chloride, steam distilling the mixture from an alkaline medium and fractionating the mixture.

2. The method of separating terpene compounds from gasoline, which includes treating a mixture of gasoline and terpene compounds with hydrogen chloride, distilling the mixture from an alkaline medium and fractionating the distillate.

3. The method of separating terpene compounds from gasoline, which includes treating a mixture of gasoline and terpene compounds with hydrogen chloride, heating the mixture with a solution of an alkali and fractionating the mixture.

4. The method of separating terpene compounds from gasoline, which includes saturating a mixture of gasoline and terpene compounds with hydrogen chloride, distilling the mixture from an alkaline medium and fractionating the distillate.

5. The method of separating terpene compounds from gasoline, which includes saturating a mixture of gasoline and terpene compounds with hydrogen chloride, steam distilling the mixture from aqueous sodium hydroxide and fractionating the mixture.

6. The method of separating terpene compounds from gasoline, which includes saturating a mixture of gasoline and terpene compounds with hydrogen chloride, steam distilling the mixture from aqueous sodium hydroxide, distilling the terpene compounds from alcoholic sodium hydroxide and fractionating the distillate.

7. The method of separating terpene compounds from gasoline, which includes treating a mixture of gasoline and dipentene with a reagent to effect conversion of the dipentene into its dihydrochloride heating the dihydrochloride with an alkali to effect its conversion into terpineol and fractionating the mixture.

8. The method of separating terpene compounds from gasoline, which includes treating a mixture of gasoline and terpene compounds including dipentene with a reagent to effect conversion of the dipentene into its dihydrochloride, steam distilling the mixture from an alkaline medium and fractionating the distillate.

9. The method of separating terpene compounds from gasoline, which includes treating a mixture of gasoline and terpene compounds including dipentene with a reagent to effect conversion of the dipentene into its dihydrochloride, steam distilling the mixture from caustic soda, heating the distillate with alcoholic sodium hydroxide and fractionating the distillate.

10. The method of separating terpene compounds from gasoline which includes treating a mixture of gasoline and a terpene compound with a hydrogen halide to effect conversion of the terpene compound to a hydrogen halide terpene addition product, distilling from an alkaline medium to form terpineol and fractionating the distillate.

11. The method of separating dipentene from gasoline which includes treating a mixture of gasoline and dipentene with a hydrogen halide to effect conversion of dipentene to a hydrogen halide dipentene addition product, distilling from an alkaline medium to form terpineol and fractionating the distillate.

12. The method of separating terpene compounds other than turpentine and pine oil from gasoline, which includes treating a mixture of gasoline and terpene compounds including dipentene with a reagent capable of forming a terpene-hydrohalide addition product and treating the reaction mass with an alkaline medium to effect conversion of the reaction product into terpineol and fractionating the mixture.

In testimony of which invention, I have hereunto set my hand, at Kenvil, New Jersey, on this 14th day of June, 1928.

ALAN C. JOHNSTON.